US012411439B2

(12) United States Patent
Itabashi

(10) Patent No.: US 12,411,439 B2
(45) Date of Patent: Sep. 9, 2025

(54) IMAGE FORMING APPARATUS INCLUDING PROCESS CARTRIDGE, AND TONER CARTRIDGE HAVING TONER SHUTTER PIVOTALLY MOVABLE IN A STATE WHERE TONER CARTRIDGE IS ATTACHED TO PROCESS CARTRIDGE

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/675,870

(22) Filed: May 28, 2024

(65) Prior Publication Data

US 2024/0310754 A1 Sep. 19, 2024

Related U.S. Application Data

(63) Continuation of application No. PCT/JP2022/043899, filed on Nov. 29, 2022.

(30) Foreign Application Priority Data

Dec. 3, 2021 (JP) ................................ 2021-196723

(51) Int. Cl.
*G03G 15/00* (2006.01)
*G03G 15/08* (2006.01)
(Continued)

(52) U.S. Cl.
CPC ..... *G03G 15/0886* (2013.01); *G03G 15/0863* (2013.01); *G03G 15/0865* (2013.01);
(Continued)

(58) Field of Classification Search
CPC ........... G03G 15/0863; G03G 15/0865; G03G 15/0886; G03G 21/1652; G03G 21/1814; G03G 21/1867
(Continued)

(56) References Cited

U.S. PATENT DOCUMENTS 11,209,755 B2 * 12/2021 Kubo ................ G03G 15/0877
11,422,484 B2 * 8/2022 Wada ................ G03G 15/5004
(Continued)

FOREIGN PATENT DOCUMENTS

JP 9-190060 A 7/1997
JP 2014-038243 A 2/2014
(Continued)

OTHER PUBLICATIONS

International Preliminary Report on Patentability issued in corresponding International Patent Application No. PCT/JP2022/043899, May 2, 2024.
International Search Report issued in PCT/JP2022/043899, Jan. 31, 2023.

*Primary Examiner* — Hoan H Tran
(74) *Attorney, Agent, or Firm* — Merchant & Gould P.C.

(57) ABSTRACT

An image forming apparatus includes: a main housing including a main electrical contact; a process cartridge attachable to and detachable from the main housing; and a toner cartridge attachable to and detachable from the process cartridge attached to the main housing. The process cartridge includes: a first process electrical contact configured to contact the main electrical contact; and a second process electrical contact. The toner cartridge includes: a toner housing having a toner outlet port and configured to accommodate toner therein; a toner memory including a toner electrical contact; and a toner shutter. In a state where the toner cartridge is attached to the process cartridge, the toner electrical contact is in contact with the second process
(Continued)

electrical contact; and the toner shutter is pivotally movable relative to the second process electrical contact and the toner electrical contact to open and close the toner outlet port.

15 Claims, 11 Drawing Sheets

(51) Int. Cl.
*G03G 21/16* (2006.01)
*G03G 21/18* (2006.01)

(52) U.S. Cl.
CPC ..... *G03G 21/1652* (2013.01); *G03G 21/1814* (2013.01); *G03G 21/1867* (2013.01)

(58) Field of Classification Search
USPC .................................... 399/90, 107, 110, 111
See application file for complete search history.

(56) References Cited

U.S. PATENT DOCUMENTS

| | | | |
|---|---|---|---|
| 2014/0050507 | A1 | 2/2014 | Hamada et al. |
| 2022/0155708 | A1 | 5/2022 | Sato et al. |
| 2022/0197185 | A1 | 6/2022 | Kamimura et al. |
| 2022/0229383 | A1 | 7/2022 | Matsumoto et al. |

FOREIGN PATENT DOCUMENTS

| | | | |
|---|---|---|---|
| JP | 2021-026199 | A | 2/2021 |
| JP | 2021-026200 | A | 2/2021 |
| JP | 2021-026201 | A | 2/2021 |
| JP | 2021-026202 | A | 2/2021 |
| JP | 2021-056432 | A | 4/2021 |
| WO | 2020/046338 | A1 | 3/2020 |
| WO | 2021/065710 | A1 | 4/2021 |

* cited by examiner

IMAGE FORMING APPARATUS INCLUDING PROCESS CARTRIDGE, AND TONER CARTRIDGE HAVING TONER SHUTTER PIVOTALLY MOVABLE IN A STATE WHERE TONER CARTRIDGE IS ATTACHED TO PROCESS CARTRIDGE

REFERENCE TO RELATED APPLICATIONS

This is a by-pass continuation application of International Application No. PCT/JP2022/043899 filed on Nov. 29, 2022 which claims priority from Japanese Patent Application No. 2021-196723 filed on Dec. 3, 2021. The entire contents of the International Application and the priority application are incorporated herein by reference.

BACKGROUND ART

There has been conventionally known an image forming apparatus including a main housing to which a cartridge is attachable. The cartridge includes a developing roller and a developer container accommodating therein toner. In such a conventional image forming apparatus, replacing an old cartridge with a new cartridge is known as a system for replenishing the image forming apparatus with toner when toner in the old cartridge is used up. However, in such a system, replacement of the cartridge including the developing roller is performed even when the developing roller does not reach the end of a service life.

There has also been conventionally known another system in which a toner cartridge filled with toner for replenishment is attachable to a cartridge while the cartridge is attached to the main housing of the image forming apparatus for replenishing the image forming apparatus with toner. In this system, replenishment of the image forming apparatus with toner can be performed without replacing the developing roller.

SUMMARY

However, in the latter system, a toner memory storing therein information on the toner cartridge must be provided at the toner cartridge in order to enable the image forming apparatus to perform control operation in conformance with the attached toner cartridge.

According to one aspect, the present disclosure provides an image forming apparatus including: a main housing; a process cartridge; and a toner cartridge. The main housing has a first opening and a second opening. The main housing includes a main electrical contact. The process cartridge is attachable to and detachable from the main housing through the first opening. The process cartridge includes: a developing roller; a process housing; a first process electrical contact; and a second process electrical contact. The developing roller is rotatable about a developing roller axis extending in a first direction. The process housing has a toner inlet port and is configured to accommodate toner therein. The first process electrical contact is in contact with the main electrical contact in a state where the process cartridge is attached to the main housing. The second process electrical contact is electrically connected to the first process electrical contact. The toner cartridge is attachable to and detachable from the process cartridge through the second opening in a second direction different from the first direction in a state where the process cartridge is attached to the main housing. The toner cartridge includes: a toner housing; a toner memory; and a toner shutter. The toner housing has a toner outlet port and is configured to accommodate toner therein. The toner memory includes a toner electrical contact. The toner memory stores therein information related to the toner cartridge. The toner shutter is configured to open and close the toner outlet port. In a state where the toner cartridge is attached to the process cartridge: a part of the toner housing is exposed to an outside of the main housing; the toner electrical contact is in contact with the second process electrical contact; and the toner shutter is pivotally movable about a toner shutter axis extending in the second direction relative to the second process electrical contact and the toner electrical contact between: a first position in which the toner shutter closes the toner outlet port; and a second position in which the toner shutter opens the toner outlet port.

With the above structure, in a state where the toner cartridge is attached to the process cartridge, the toner electrical contact can be electrically connected to the second process electrical contact of the process cartridge.

DESCRIPTION

Hereinafter, one embodiment of the present disclosure will be described while referring to the accompanying drawings.

1. Overview of Monochromatic Printer 1

Figure 1:
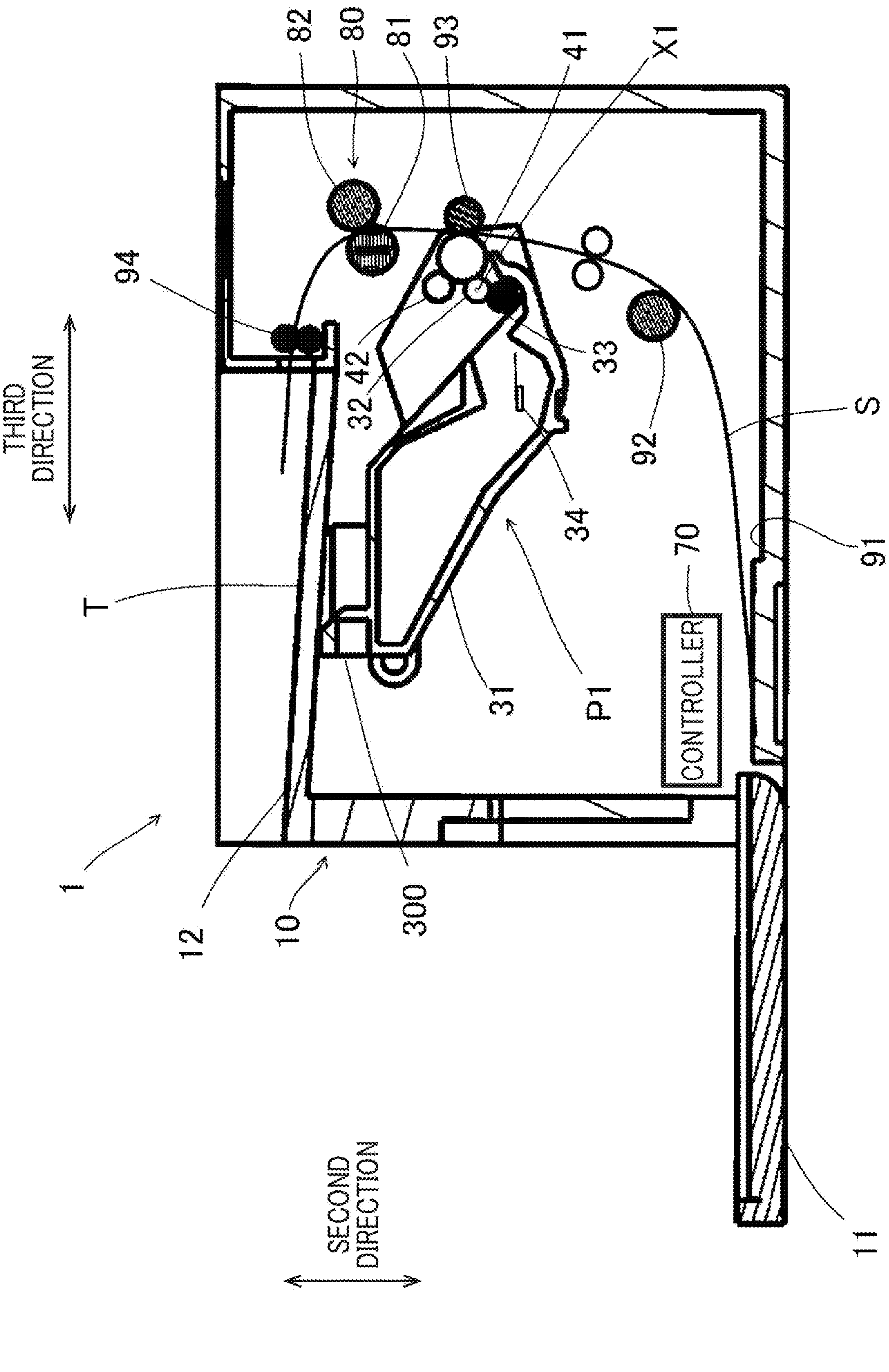
FIG. 1 is a cross-sectional view of a monochromatic printer as an example of the image forming apparatus.
Figures 2A, 2B, 2C:
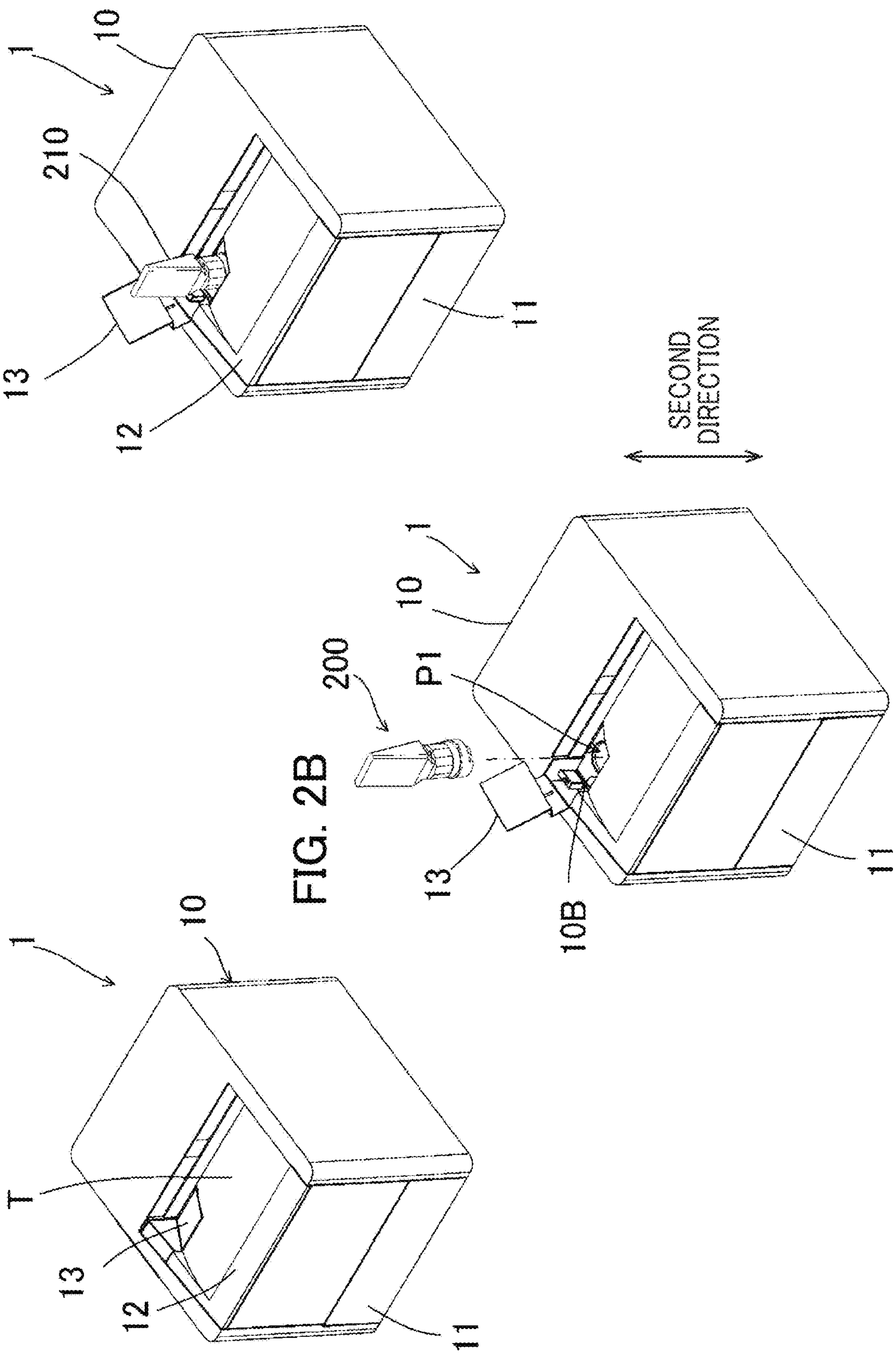
FIG. 2A is a perspective view of the monochromatic printer in which a process cartridge is attached to a main housing, and illustrating a state where a replenishment cover is closed.
FIG. 2B is a perspective view of the monochromatic printer in which the process cartridge is attached to the main housing, and illustrating a state where the replenishment cover is open and a toner cartridge is not attached to the process cartridge.
FIG. 2C is a perspective view of the monochromatic printer in which the process cartridge is attached to the main housing, and illustrating a state where the replenishment cover is open and the toner cartridge is attached to the process cartridge.

As illustrated in FIGS. 1 through 2C, a monochromatic printer 1 as an example of the image forming apparatus includes a main housing 10, a controller 70, a process cartridge P1, and a toner cartridge 200.

Figures 3A, 3B, 3C:
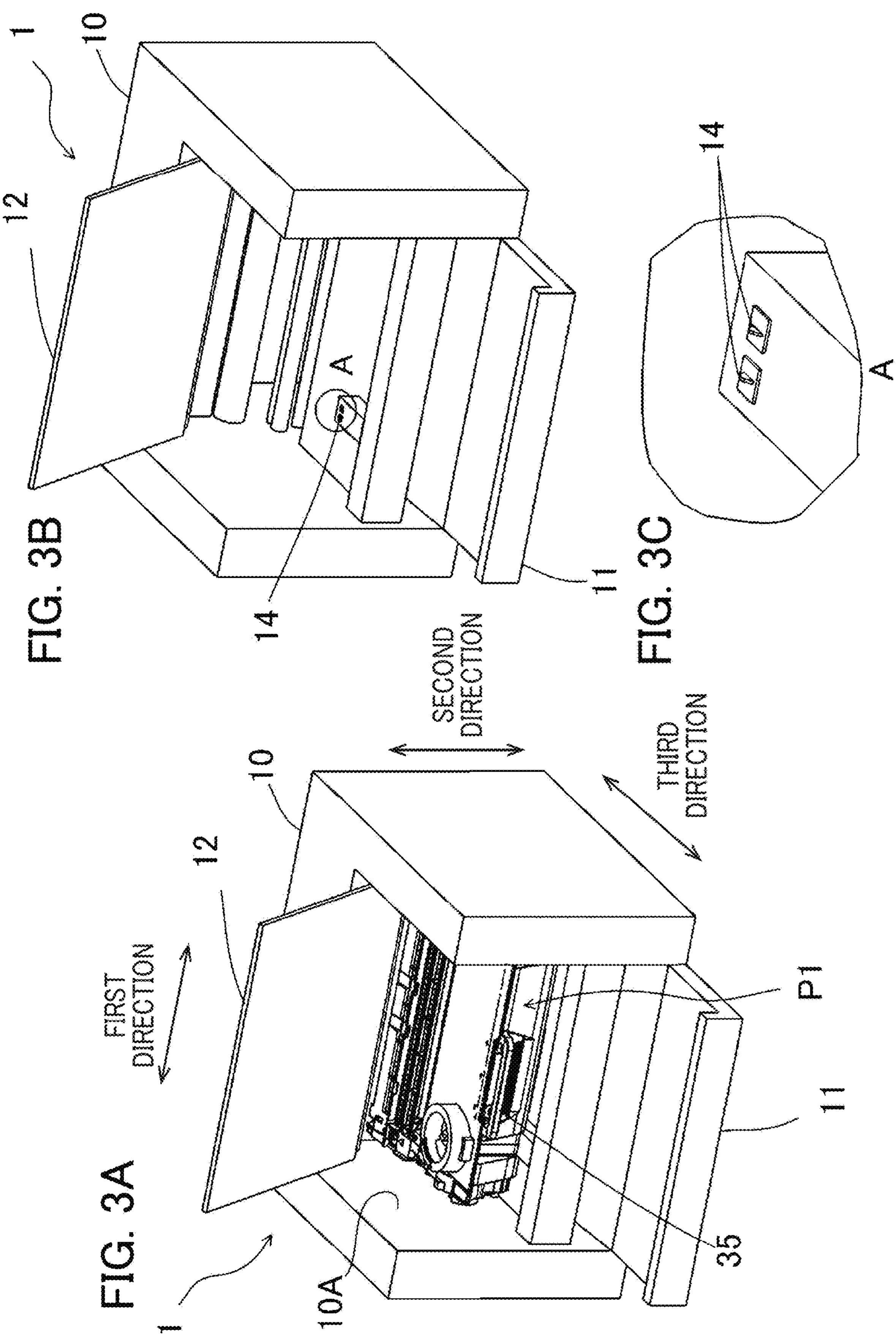
FIG. 3A is a perspective view of the monochromatic printer in which a front cover and a top cover are open, and illustrating a state where the process cartridge is attached to the main housing.
FIG. 3B is a perspective view of the monochromatic printer in which the front cover and the top cover are open, and illustrating a state where the process cartridge is not attached to the main housing.
FIG. 3C is an enlarged perspective view of a main electrical contact.

As illustrated in FIGS. 1 and 3A, the process cartridge P1 includes a process housing 31, a developing roller 32, a supply roller 33, an agitator 34, a cartridge handle 35, a photosensitive drum 41, and a charge roller 42.

In the following description, a direction in which a rotation axis (a developing axis X1) of a developing roller 22 of a developing cartridge 20 extends will be referred to as "first direction". Further, a direction in which the toner cartridge 200 is attachable to and detachable from the process cartridge P1 in a state where the process cartridge P1 is attached to the main housing 10 of the monochromatic printer 1 will be referred to as "second direction". Still further, a direction perpendicular to both the first direction and the second direction will be referred to as "third direction".

The process housing 31 is configured to accommodate toner therein. The process housing 31 has toner inlet ports 300A.

The developing roller 32 is configured to supply toner accommodated in the process housing 31 to an outer circumferential surface of the photosensitive drum 41. The developing roller 32 is rotatable about the developing roller axis X1 extending in the first direction. The developing roller 32 is positioned at one end in the third direction of the process housing 31 in a state where the process cartridge P1 is attached to the main housing 10.

The supply roller 33 is rotatable about a supply roller axis extending in the first direction. The supply roller 33 is configured to supply toner to an outer circumferential surface of the developing roller 32.

The agitator 34 is rotatable about an agitator axis extending in the first direction. The agitator 34 is configured to agitate toner in the process housing 31.

The photosensitive drum 41 is configured to carry on the outer circumferential surface an electrostatic latent image formed by an exposure unit (not illustrated), and also to carry on the outer circumferential surface a toner image formed by toner supplied from the developing roller 32 to the carried electrostatic latent image. The photosensitive drum 41 is also configured to transfer the carried toner image onto a sheet S when the sheet S is nipped between the photosensitive drum 41 and a transfer roller 93 (described later).

The charge roller 42 is configured to charge the outer circumferential surface of the photosensitive drum 41 by contacting the photosensitive drum 41 while a voltage is applied thereto.

A fixing unit 80 includes a heating unit 81, and a pressure unit 82. The fixing unit 80 is configured to fix the toner image to the sheet S when the sheet S having the toner image transferred thereon is nipped between the heating unit 81 and the pressure unit 82.

A sheet conveying unit 90 includes a sheet accommodating unit 91, a pick-up roller 92, the transfer roller 93, and discharge rollers 94. The sheet accommodating unit 91 is configured to accommodate therein sheets S. The pick-up roller 92 is configured to convey the sheet S from the sheet accommodating part 91 toward the photosensitive drum 41. The transfer roller 93 is configured to convey the sheet S toward the fixing unit 80 while nipping the sheet S in cooperation with the photosensitive drum 41. The discharge rollers 94 are configured to discharge the sheet S passed through the fixing unit 80 out of the main housing 10. The sheet S discharged out of the main housing 10 is to be mounted on a discharge tray T.

As illustrated in FIGS. 2B and 2C, the toner cartridge 200 is attachable to the process cartridge P1 in a state where the process cartridge P1 is attached to the main housing 10. When attached to the process cartridge P1, the toner cartridge 200 can supply toner to the process cartridge P1.

The controller 70 includes, for example, a CPU, a RAM, a ROM, and an input/output circuit. The controller 70 is configured to control operations in the monochromatic printer 1 by executing arithmetic processing on the basis of a program stored in the ROM and the like. Further, the controller 70 is configured to control operations in the monochromatic printer 1 on the basis of information stored in a process memory (not illustrated) of the process cartridge P1 attached to the main housing 10, information stored in a toner memory 260 (FIG. 6A, described later) of the toner cartridge 200 attached to the process cartridge P1, and the like.

2. Details of Main Housing 10

As illustrated in FIGS. 2A through 3C, the main housing 10 includes a front cover 11, a top cover 12, a replenishment cover 13, and a main electrical contact 14. Further, the main housing 10 has a first opening 10A, and a second opening 10B.

As illustrated in FIGS. 3A and 3B, the front cover 11 is configured to open and close a part of the first opening 10A. A user can place sheets S in the sheet accommodating unit 91 in a state where the front cover 11 is open.

The top cover 12 is configured to open and close another part of the first opening 10A. In a state where the top cover 12 is closed, the top cover 12 constitutes the discharge tray T. The process cartridge P1 is attachable to and detachable from the main housing 10 through the first opening 10A. Hence, the process cartridge P1 is attachable to and detachable from the main housing 10 in a state where the top cover 12 is open.

As described above, the process cartridge P1 includes the cartridge handle 35. The cartridge handle 35 is positioned at another end in the third direction of the process housing 31. The user grips the cartridge handle 35 when attaching and detaching the process cartridge P1 to and from the main housing 10.

The replenishment cover 13 is positioned at one end in the second direction of the main housing 10. The replenishment cover 13 is configured to open and close the second opening 10B. As illustrated in FIG. 2A, the replenishment cover 13 constitutes the discharge tray T in a state where the replenishment cover 13 closes the second opening 10B. As illustrated in FIG. 2B, the replenishment cover 13 allows a toner replenishing part 300 (described later) of the process cartridge P1 to be exposed to an outside in a state where the replenishment cover 13 opens the second opening 10B.

As illustrated in FIGS. 2B and 2C, the toner cartridge 200 is attachable to and detachable from the process cartridge P1 in the second direction through the second opening 10B in a state where the process cartridge P1 is attached to the main housing 10. That is, the toner cartridge 200 is attachable to the process cartridge P1 in a state where the replenishment cover 13 is open.

As illustrated in FIGS. 3A through 3C, the main electrical contact 14 is positioned below the process cartridge P1 in a state where the process cartridge P1 is attached to the main housing 10. The main electrical contact 14 is in contact with a first process electrical terminal 331 (FIG. 4A, described later) in a state where the process cartridge P1 is attached to the main housing 10. The main electrical contact 14 is electrically connected to the controller 70.

3. Particular Structure of Process Cartridge P1 in Relation to Toner Cartridge 200

3-1. Overview of Process Cartridge P1

Figure 4B:
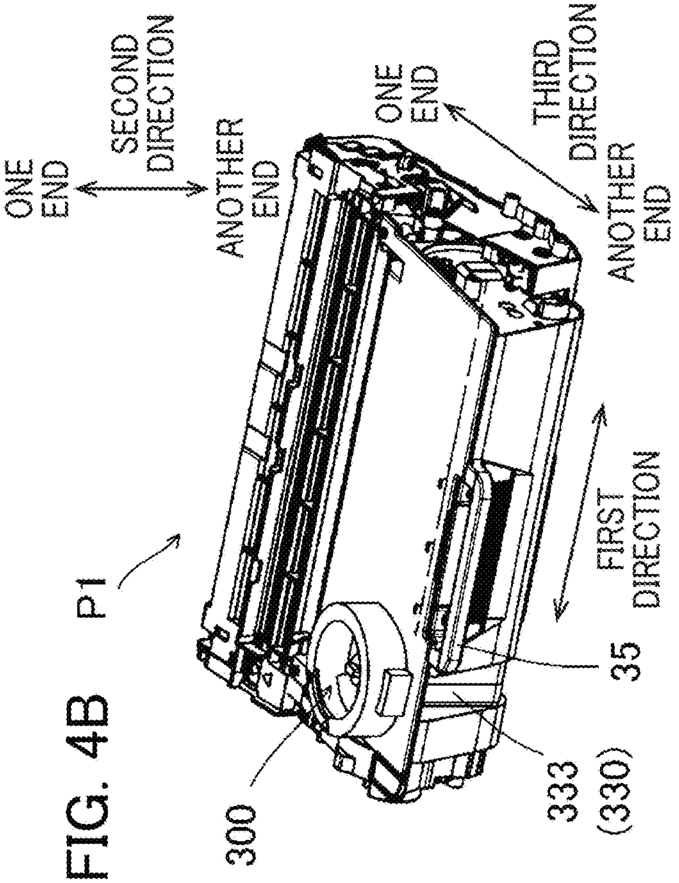
FIG. 4B is a perspective view of the process cartridge as viewed from a side at which a toner replenishing part is positioned.
Figure 4C:
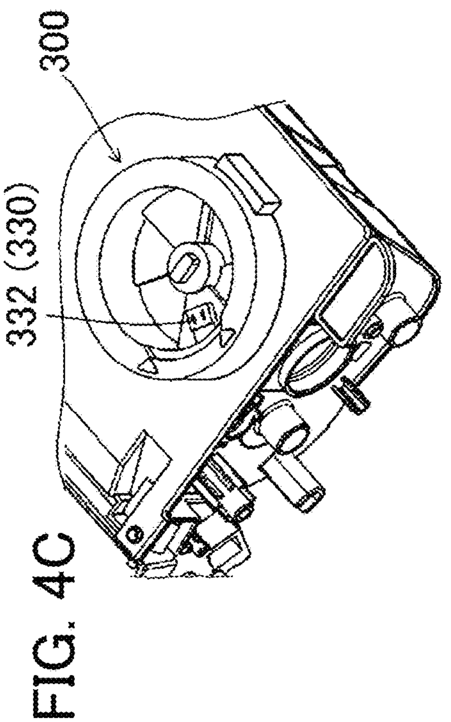
FIG. 4C is a partial enlarged perspective view of the process cartridge illustrating a portion in the vicinity of a second process electrical contact positioned on the toner replenishing part.
Figure 4A:
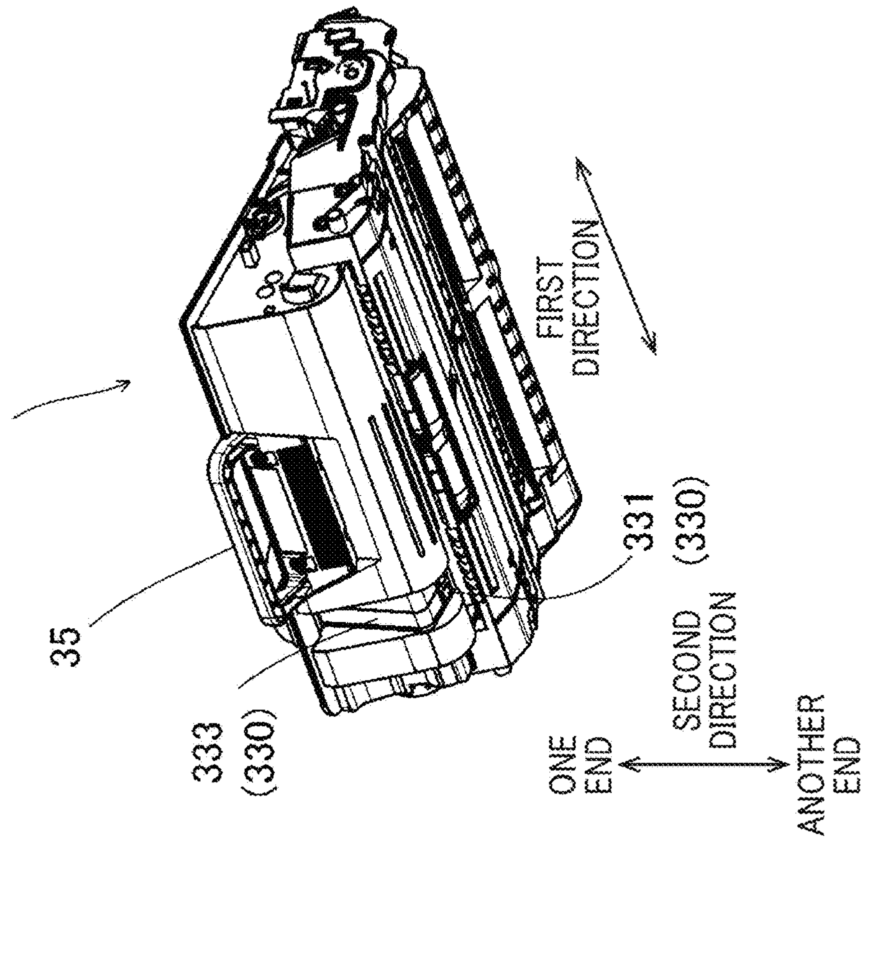
FIG. 4A is a perspective view of the process cartridge as viewed from a side at which a first process electrical contact is positioned.
Figures 5A, 5B, 5C, 5D, 5E:
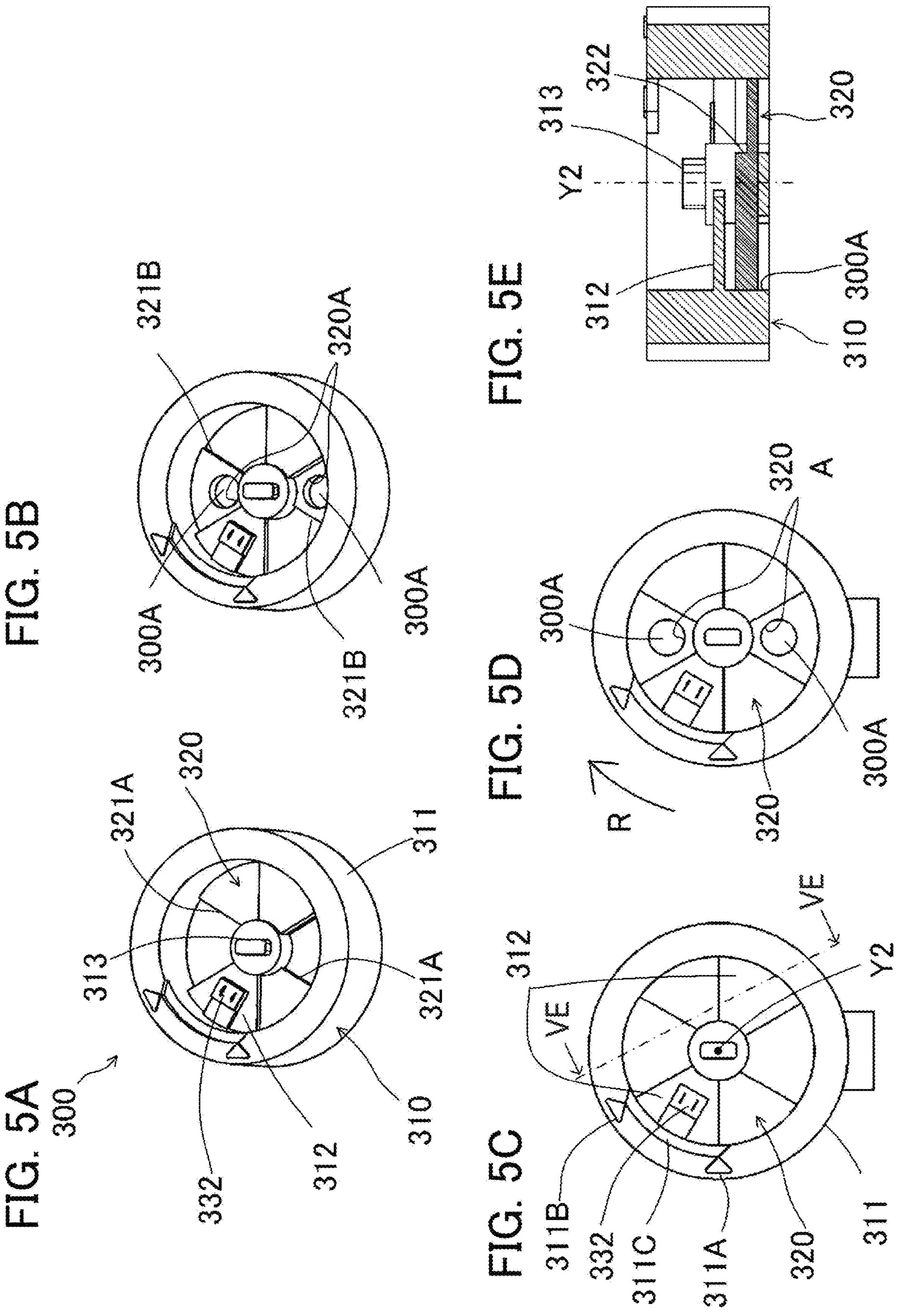
FIG. 5A is a perspective view of the toner replenishing part, and illustrating a state where a process shutter is in a third position.
FIG. 5B is a perspective view of the toner replenishing part, and illustrating a state where the process shutter is in a fourth position.
FIG. 5C is a front view of the toner replenishing part, and illustrating a state where the process shutter is in the third position.
FIG. 5D is a front view of the toner replenishing part, and illustrating a state where the process shutter is in the fourth position.
FIG. 5E is a cross-sectional view of the toner replenishing part taken along line VE-VE in FIG. 5C.

As illustrated in FIGS. 4A through 4C, the process cartridge P1 includes the toner replenishing part 300, and a process electrical relay part 330.

The toner replenishing part 300 is a part to which the toner cartridge 200 is attachable. As illustrated in FIG. 4B, the toner replenishing part 300 is positioned at one end in the second direction of the process housing 31. Toner in the toner cartridge 200 is supplied to the process housing 31 through the toner inlet ports 300A in a state where the toner cartridge 200 is attached to the toner replenishing part 300.

The process electrical relay part 330 electrically connects the toner memory 260 of the toner cartridge 200 and the main electrical contact 14 of the main housing 10 to each other in a state where the toner cartridge 200 is attached to the toner replenishing part 300.

3-2. Details of Process Electrical Relay Part 330

The process electrical relay part 330 includes the first process electrical terminal 331, a second process electrical terminal 332, and a harness 333.

As illustrated in FIG. 4A, the first process electrical terminal 331 is positioned opposite the toner replenishing part 300 in the second direction. In other words, the first process electrical terminal 331 is positioned at another end in the second direction of the process housing 31. The first process electrical terminal 331 is in contact with the main electrical contact 14 in a state where the process cartridge P1 is attached to the main housing 10.

The second process electrical terminal 332 is positioned at the toner replenishing part 300. In other words, the second process electrical terminal 332 is positioned at the one end in the second direction of the process housing 31. The second process electrical terminal 332 is in contact with a toner electrical contact 261 (FIG. 6A, described later) of the toner memory 260 in a state where the toner cartridge 200 is attached to the process cartridge P1.

The harness 333 electrically connects the first process electrical terminal 331 and the second process electrical terminal 332 to each other. Accordingly, the second process electrical terminal 332 is electrically connected to the first process electrical terminal 331. The harness 333 extends along an opposite end in the third direction of the process housing 31 from the developing roller 32 to electrically connect the first process electrical terminal 331 and the second process electrical terminal 332 to each other. In other words, at least a part of the harness 333 is positioned at the other end in the third direction of the process housing 31.

Note that the first process electrical terminal 331 and the second process electrical terminal 332 are positioned closer to the other end in the third direction of the process housing 31 than to the one end in the third direction of the process housing 31.

3-3. Details of Toner Replenishing Part 300

As illustrated in FIGS. 5A through 5E, the toner replenishing part 300 includes a main body part 310, and a process shutter 320. The process shutter 320 is pivotally movable relative to the main body part 310 to open and close the toner inlet ports 300A.

The main body part 310 includes a hollow cylindrical part 311, process retaining plates 312, and a protrusion 313.

The hollow cylindrical part 311 protrudes in the second direction from the process housing 31 and extends in the second direction. The hollow cylindrical part 311 covers at least a part of an outer peripheral surface of a toner shutter 240 (FIGS. 6A and 6B, described later) in a state where the toner cartridge 200 is attached to the process cartridge P1. The hollow cylindrical part 311 includes a first mark 311A and a second mark 311B, and has a guide groove 311C.

The first mark 311A is a protrusion protruding in the second direction. The first mark 311A has a triangular shape when viewed in the second direction.

The second mark 311B is a protrusion protruding in the second direction. The second mark 311B has a triangular shape when viewed in the second direction. The second mark 311B is positioned downstream relative to the first mark 311A in a pivot direction R of the process shutter 320 when the process shutter 320 pivotally moves from a process closed position to a process open position.

The guide groove 311C is a groove recessed in the second direction. The guide groove 311C is configured to guide a handle protrusion 233 (FIG. 7A, described later) of the toner cartridge 200. The guide groove 311C extends between the first mark 311A and the second mark 311B in a pivot direction of the process shutter 320.

The process retaining plates 312 protrude radially inward from an inner peripheral surface of the hollow cylindrical part 311.

Note that the second process electrical terminal 332 is positioned on one of the process retaining plates 312. The second process electrical terminal 332 faces in the second direction.

The protrusion 313 is positioned at a diametrical center of the hollow cylindrical part 311. The protrusion 313 is provided at a position overlapped with a process shutter axis Y2 which is a pivot axis of the process shutter 320. The protrusion 313 protrudes in the second direction. Specifically, the protrusion 313 protrudes in a direction away from the process shutter 320 in the second direction. The protrusion 313 has a substantially rectangular shape when viewed in the second direction. However, the protrusion 313 may have a shape other than a rectangular shape as long as the shape of the protrusion 313 is determined so as to be in conformance with a shape of a groove 224 (FIGS. 7A and 7B, described later) of the toner cartridge 200.

The process shutter 320 is pivotally movable about the process shutter axis Y2 extending in the second direction. The process shutter 320 has a disc like shape, and is positioned in an inner space defined by the hollow cylindrical part 311. The process shutter 320 includes first stepped parts 321A, and second stepped parts 321B. The first stepped parts 321A and the second stepped parts 321B are configured to be pressed by the toner shutter 240 (described later) of the toner cartridge 200 attached to the process cartridge P1 for pivotally moving the process shutter 320 about the process shutter axis Y2.

As described above, the process shutter 320 is configured to open and close the toner inlet ports 300A. Specifically, the process shutter 320 is pivotally movable between a third position (a position illustrated in FIGS. 5A and 5C) in which the process shutter 320 closes the toner inlet ports 300A and a fourth position (a position illustrated in FIGS. 5B and 5D) in which the process shutter 320 opens the toner inlet ports 300A.

The process shutter 320 has shutter openings 320A. In a state where the process shutter 320 is in the fourth position, the shutter openings 320A are in communication with the respective toner inlet ports 300A. Hence, the toner inlet ports 300A are exposed to the outside through the respective shutter openings 320A.

4. Details of Toner Cartridge 200

4-1. Outline of Toner Cartridge 200

As illustrated in FIGS. 6A through 7B, the toner cartridge 200 includes a toner housing 201, a handle 230, the toner shutter 240, a seal member 250, and the toner memory 260.

The toner housing 201 is configured to accommodate toner therein. The toner housing 201 has toner outlet ports 223A. More specifically, the toner housing 201 includes a toner container 210 accommodating toner therein, and a nozzle 220 having the toner outlet ports 223A.

The toner container 210 has a toner container opening 210A allowing toner accommodated in the toner container 210 to be discharged out of the toner container 210 therethrough. The toner container 210 is made of resin such as ABS (acrylonitrile butadiene styrene), BS (butadiene styrene), and the like. However, the toner container 210 may be made of other material. For example, the toner container 210 may be a bag made from flexible plastic, or a paper container. A part of the toner container 210 is exposed to the outside of the main housing 10 in a state where the toner cartridge 200 is attached to the process cartridge P1. In other words, a part of the toner housing 201 is exposed to the outside of the main housing 10 in a state where the toner cartridge 200 is attached to the process cartridge P1.

As described above, the nozzle 220 has the toner outlet ports 223A. The nozzle 220 is configured to allow toner accommodated in the toner container 210 to be discharged out of the toner cartridge 200 through the toner outlet ports 223A.

The handle 230 has a hollow cylindrical shape. The handle 230 covers an outer peripheral surface of the nozzle 220. In other words, the nozzle 220 is positioned inside the hollow cylindrical handle 230. The handle 230 is positioned between the toner container 210 and the toner shutter 240 in the second direction. In other words, the toner container 210 is positioned at one end in the second direction of the handle 230, and the toner shutter 240 is positioned at another end in the second direction of the handle 230.

The toner shutter 240 is positioned on the opposite side of the nozzle 220 from the toner container 210 in the second direction. In a state where the toner cartridge 200 is attached to the process cartridge P1, the toner shutter 240 is pivotally movable about a toner shutter axis Y1 extending in the second direction between a first position (a position illustrated in FIG. 6A) in which the toner shutter 240 closes the toner outlet ports 223A and a second position (a position illustrated in FIG. 6B) in which the toner shutter 240 opens the toner outlet ports 223A.

Note that the toner shutter axis Y1 and the process shutter axis Y2 coincide with each other in a state where the toner cartridge 200 is attached to the process cartridge P1. In other words, the toner shutter 240 and the process shutter 320 are coaxially pivotally movable in a state where the toner cartridge 200 is attached to the process cartridge P1.

Figure 7B:
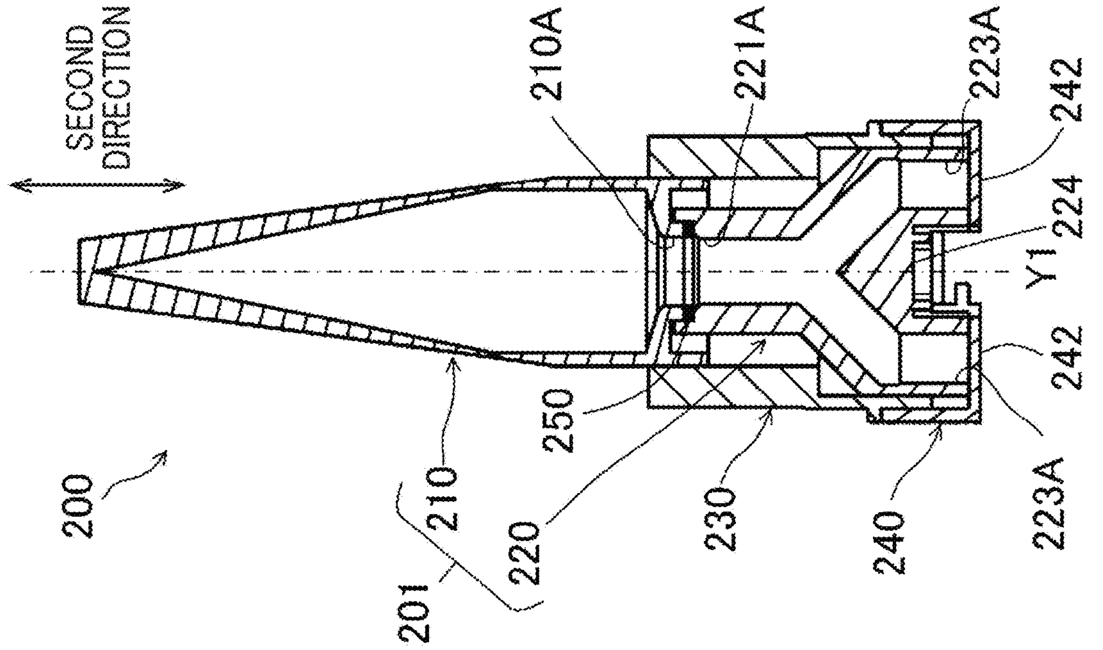
FIG. 7B is a cross-sectional view of the toner cartridge.
Figure 7A:
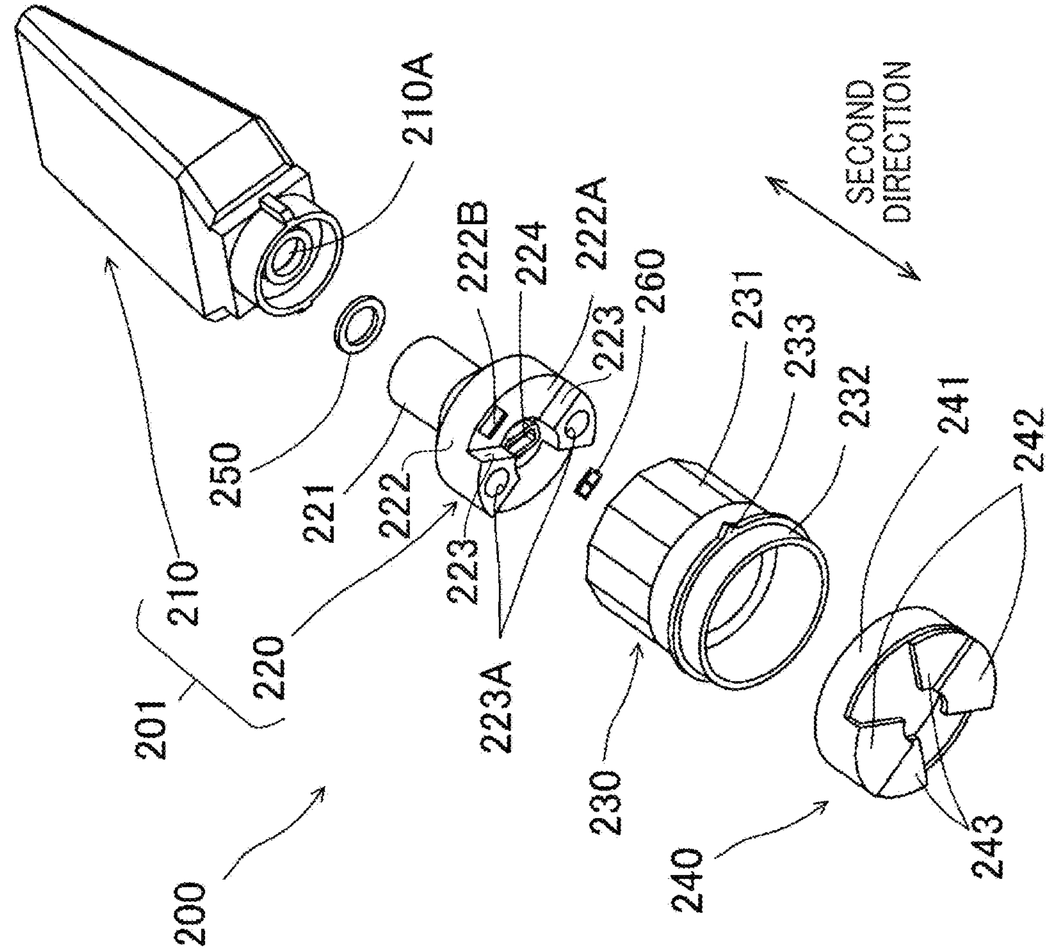
FIG. 7A is an exploded perspective view of the toner cartridge.

As illustrated in FIGS. 7A and 7B, the seal member 250 is nipped between the toner container 210 and the nozzle 220 having a communication port 221A. The seal member 250 restrains toner directed from the toner container opening 210A toward the communication port 221A from leaking out of the toner cartridge 200 through a gap between the toner container 210 and the nozzle 220.

The toner memory 260 is a storage medium configured to store therein information related to the toner cartridge 200. For example, the toner memory 260 stores therein information such as: an amount of toner accommodated in the toner cartridge 200; a serial number of the toner cartridge 200; the date of manufacture of the toner cartridge 200; the color of toner accommodated in the toner cartridge 200; and the country in which the toner cartridge 200 is sold; and the like. The toner memory 260 is positioned on the nozzle 220. The toner memory 260 includes the toner electrical contact 261. The toner electrical contact 261 is positioned on the nozzle 220. The toner electrical contact 261 faces in the second direction. Specifically, the toner electrical contact 261 faces in a direction away from the toner container 210 in the second direction.

4-2. Details of Nozzle 220

The nozzle 220 includes a first cylindrical part 221, a second cylindrical part 222, and protruding parts 223. Further, the nozzle 220 has the groove 224.

The first cylindrical part 221 has the communication port 221A which is in communication with the toner container opening 210A.

The second cylindrical part 222 has a bottom surface 222A, and an attachment groove 222B recessed from the bottom surface 222A in the second direction. The toner memory 260 is attached to the attachment groove 222B.

The protruding parts 223 protrude from the bottom surface 222A in a direction away from the first cylindrical part 221 in the first direction. The protruding parts 223 have the respective toner outlet ports 223A, which are in communication with the communication port 221A. Accordingly, the nozzle 220 allows toner in the toner container 210 to be discharged out through the toner container opening 210A, the communication port 221A, and the toner outlet ports 223A.

In the present embodiment, the nozzle 220 includes two of the protruding parts 223, and the toner outlet port 223A are formed in the respective two protruding parts 223.

The groove 224 is recessed in a direction toward the toner container 210 in the second direction. The groove 224 is formed at a position overlapped with the toner shutter axis Y1. That is, the groove 224 is aligned with the toner shutter axis Y1. The groove 224 has a substantially rectangular shape when viewed in the first direction. Note that the shape of the groove 224 need not be a rectangular shape, but may be a triangular shape or an elliptical shape when viewed in the first direction as long the protrusion 313 of the process shutter 320 can be inserted in the groove 224 to avoid pivotal movement of the protrusion 313 relative to the groove 224.

4-3. Details of Handle 230

Figure 6B:
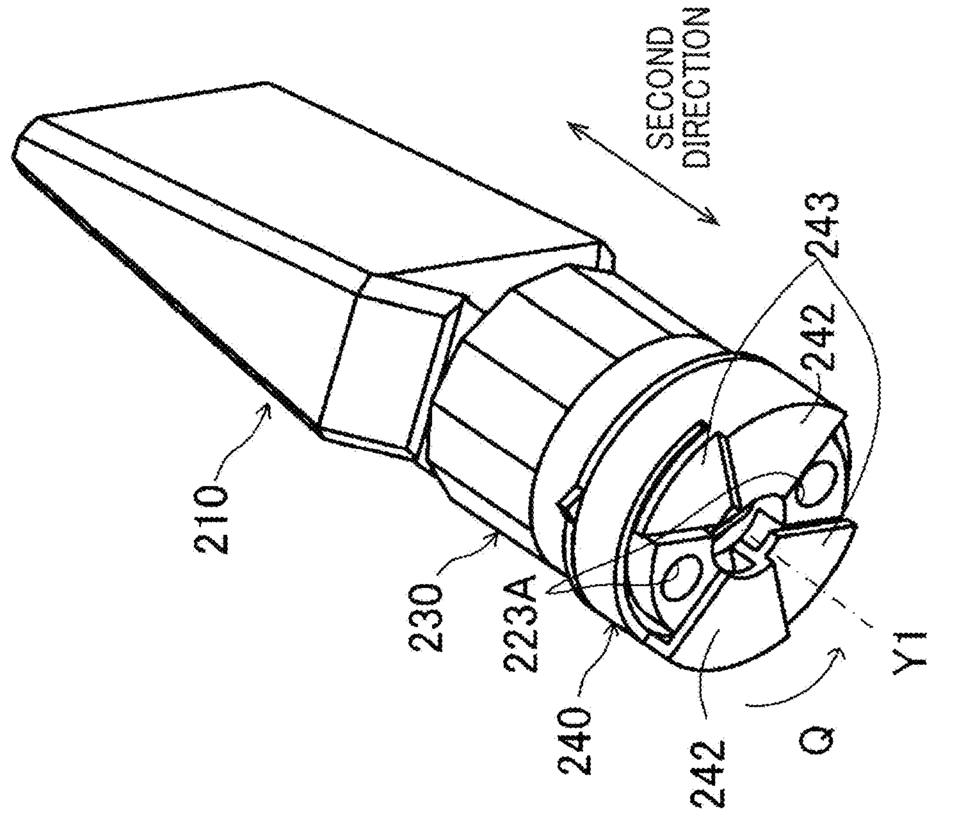
FIG. 6B is a perspective view of the toner cartridge, and illustrating a state where the toner shutter is in a second position.
Figure 6A:
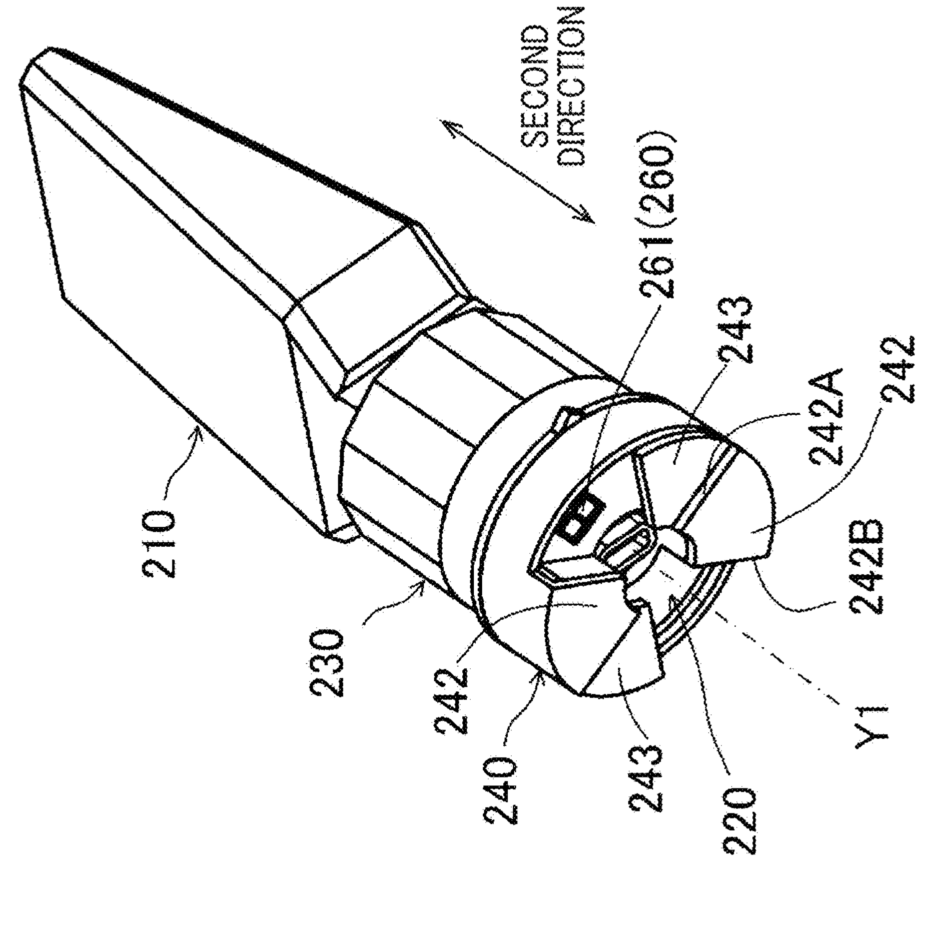
FIG. 6A is a perspective view of the toner cartridge, and illustrating a state where a toner shutter is in a first position.

The handle 230 has a hollow cylindrical shape and covers the outer peripheral surface of the nozzle 220. The toner container 210 and the toner shutter 240 are attached to the handle 230. With this configuration, as illustrated in FIGS. 6A and 6B, the toner container 210 and the toner shutter 240 pivotally move together with the handle 230 as the handle 230 pivotally moves about the toner shutter axis Y1. The handle 230 includes a grip part 231, an engagement part 232, and the handle protrusion 233.

The handle protrusion 233 has an outer peripheral surface having a polygonal shape. The user grips the grip part 231 when pivotally moving the handle 230. The toner container 210 is attached to an inner portion of the grip part 231.

The engagement part 232 is positioned on the opposite side of the grip part 231 from the toner container 210 in the second direction. The engagement part 232 is a part to which the toner shutter 240 is attached.

The handle protrusion 233 is a protrusion that protrudes radially outward from the engagement part 232. The handle protrusion 233 is a visible part for the user to visually recognize a pivot angle of the handle 230.

4-4. Details of Toner Shutter 240

The toner shutter 240 includes a hollow cylindrical part 241, shielding plates 242, and toner retaining plates 243.

The hollow cylindrical part 241 covers an outer peripheral surface of the engagement part 232 of the handle 230. The hollow cylindrical part 241 has one end in the second direction in contact with the handle 230.

The shielding plates 242 are positioned at another end in the second direction of the hollow cylindrical part 241. Each of the shielding plates 242 extends from the hollow cylindrical part 241 toward a diametrical center of the hollow cylindrical part 241. Each of the shielding plates 242 closes a corresponding one of the toner outlet ports 223A in a state where the toner shutter 240 is in the first position.

Each of the shielding plates 242 has a first end 242A, and a second end 242B. With respect to a pivot direction Q (see FIG. 6B) of the toner shutter 240 when the toner shutter 240 pivotally moves from the first position toward the second position, the first end 242A serves as a downstream end of the shielding plate 242, and the second end 242B serves as an upstream end of the shielding plate 242.

The toner retaining plates 243 are positioned at the other end in the second direction of the hollow cylindrical part 241. The toner retaining plates 243 are positioned closer to the toner container 210 than the shielding plates 242 are to the toner container 210 in the second direction. The toner shutter 240 defines gaps between the toner retaining plates 243 and the hollow cylindrical part 241 to allow the process retaining plates 312 to be inserted therein.

5. Attachment Operation of Toner Cartridge 200 to Toner Replenishing Part 300

5-1. Outline of Attachment Operation

Next, an attachment operation for attaching the toner cartridge 200 to the toner replenishing part 300 will be described with reference to FIGS. 8A through 11C.

Figure 8A:
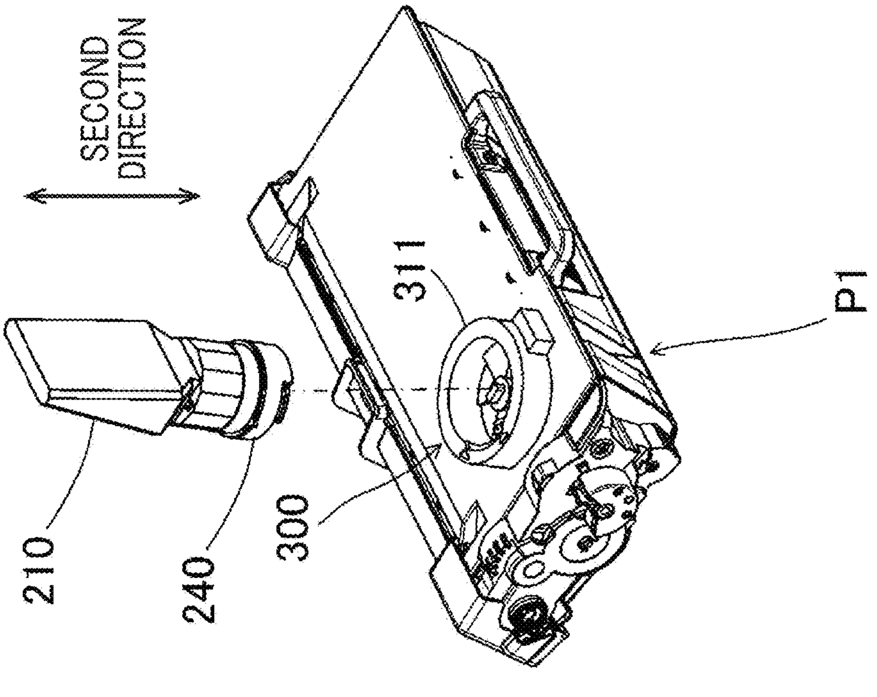
FIG. 8A is a view of the process cartridge and the toner cartridge, and illustrating a state prior to attaching the toner cartridge to the process cartridge.

In a state prior to attaching the toner cartridge 200 to the toner replenishing part 300 illustrated in FIG. 8A, the toner shutter 240 is in the first position (see FIG. 6A). Also, in a state prior to attaching the toner cartridge 200 to the toner replenishing part 300, the process shutter 320 is in the third position (see FIG. 5A).

Figure 8B:
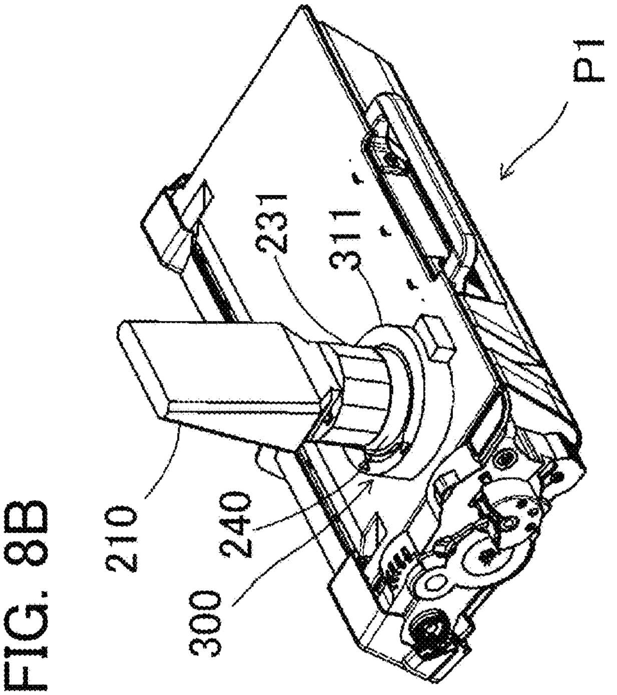
FIG. 8B is a view of the process cartridge and the toner cartridge attached thereto, and illustrating a first attachment state.
Figure 10B:
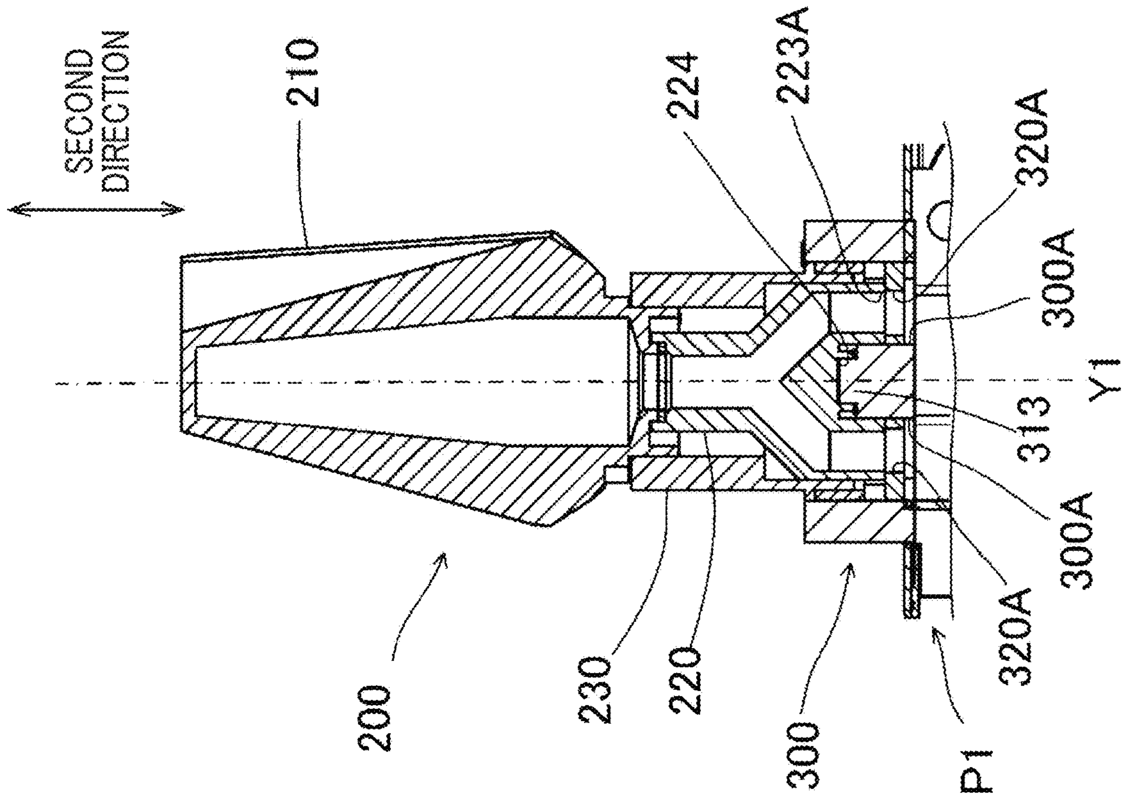
FIG. 10B is a cross-sectional view of the process cartridge and the toner cartridge attached thereto, and illustrating the second attachment state.
Figure 10A:
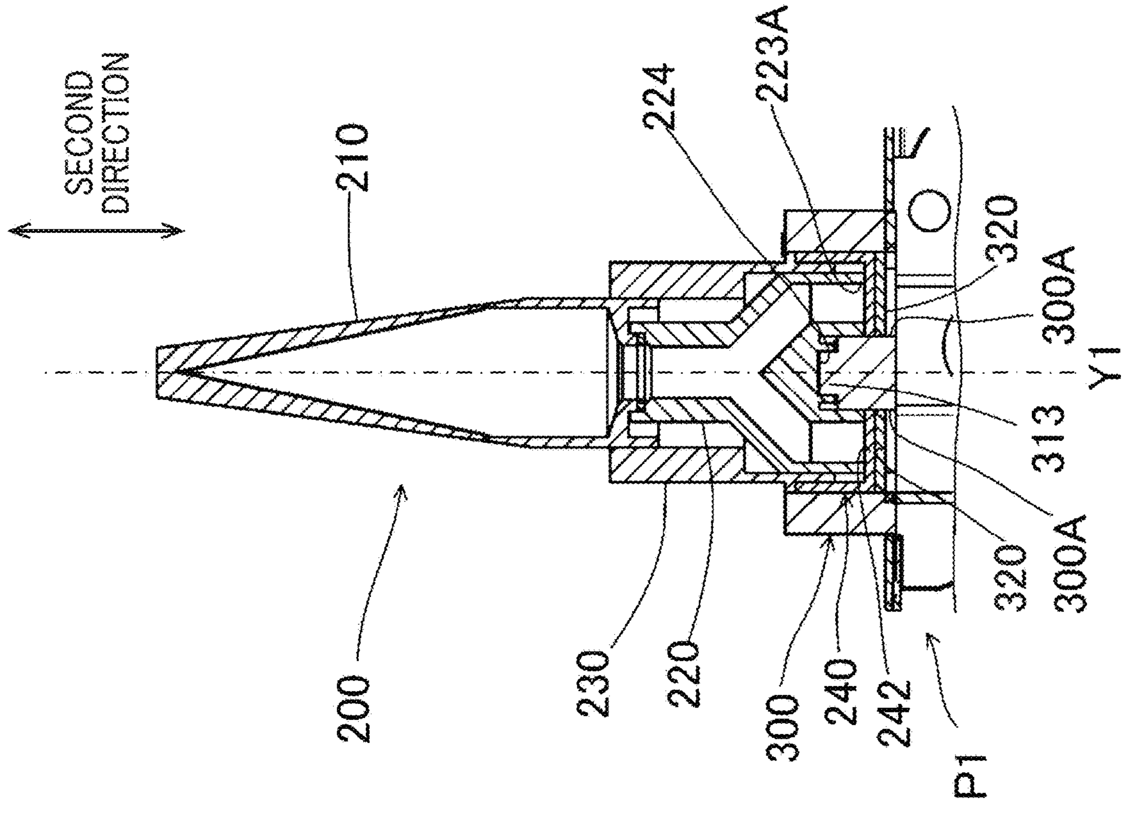
FIG. 10A is a cross-sectional view of the process cartridge and the toner cartridge attached thereto, and illustrating the first attachment state.

From a state illustrated in FIG. 8A, the user inserts the toner shutter 240 of the toner cartridge 200 into the hollow cylindrical part 311 of the toner replenishing part 300 as illustrated in FIG. 8B. At this time, the user aligns a distal end of the handle protrusion 233 with the first mark 311A when inserting the toner shutter 240. In the following description, a state of the toner cartridge 200 and the toner replenishing part 300 illustrated in FIG. 8B will be referred to as "first attachment state". FIGS. 10A and 11B also illustrate the first attachment state.

Figure 8C:
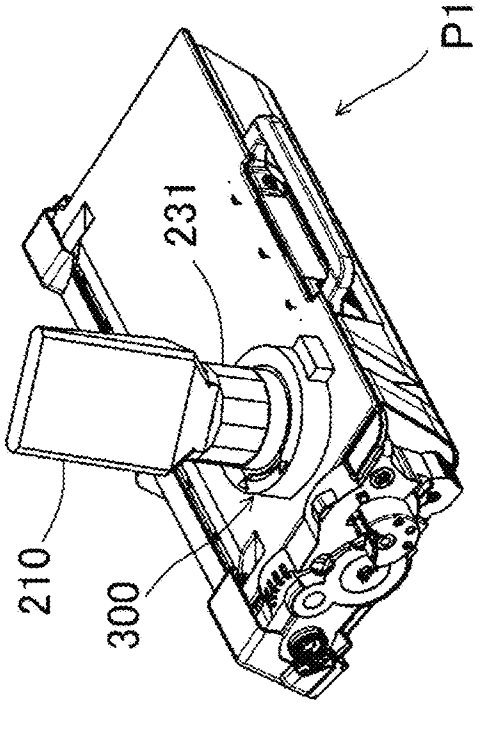
FIG. 8C is a view of the process cartridge and the toner cartridge attached thereto, and illustrating a second attachment state in which the toner shutter has pivotally moved from the first attachment state.

Then, from the state illustrated in FIG. 8B, the user pivotally moves the toner cartridge 200 relative to the process cartridge P1 as illustrated in FIG. 8C. Specifically, the user grips the grip part 231 and pivotally moves the handle 230 relative to the process housing 31 until the distal end of the handle protrusion 233 moves from the first mark 311A to reach the second mark 311B. In the following description, a state of the toner cartridge 200 and the toner replenishing part 300 illustrated in FIG. 8C will be referred to as "second attachment state". Note that FIGS. 10B and 11C also illustrate the second attachment state.

Next, a relationship between components of the toner cartridge 200 and components of the toner replenishing part 300 will be described.

5-2. Relationship Between Toner Shutter 240 and Process Shutter 320

Figure 9B:
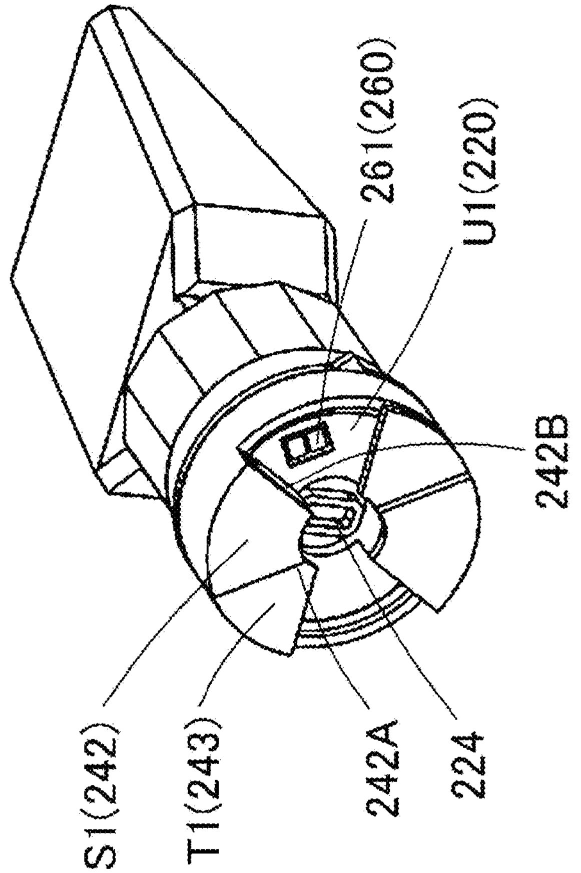
FIG. 9B is a perspective view of the toner cartridge.

As illustrated in FIG. 9B, the toner shutter 240 has a first surface S1, and a second surface T1. Both the first surface S1 and the second surface T1 face in the second direction. In the meantime, the nozzle 220 has a third surface U1. The third surface U1 is exposed to the outside in the second direction in a state where the toner shutter 240 is in the first position.

Figure 9A:
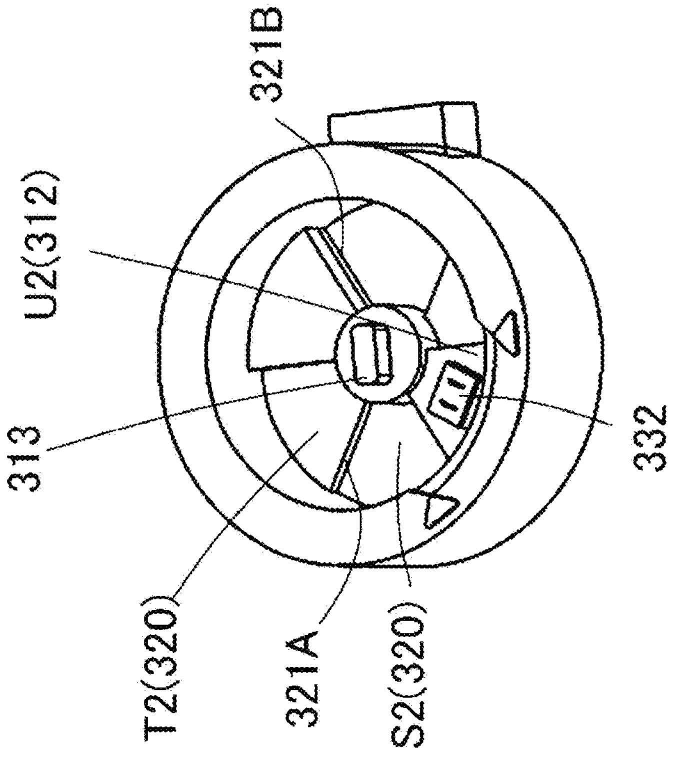
FIG. 9A is a perspective view of the toner replenishing part.

Further, as illustrated in FIG. 9A, the process shutter 320 has a fourth surface S2 and a fifth surface T2 those facing in the second direction. Further, the main body part 310 has a sixth surface U2 facing in the second direction.

In the first attachment state, the toner shutter 240 and the process shutter 320 provide such a relationship that the first surface S1 faces the fourth surface S2 in the second direction, the second surface T1 faces the fifth surface T2 in the second direction, and the third surface U1 faces the sixth surface U2 in the second direction.

Further, in the first attachment state, the first ends 242A face the corresponding first stepped parts 321A in the pivot direction of the toner shutter 240, and the second ends 242B face the corresponding second stepped parts 321B in the pivot direction of the toner shutter 240.

As the toner cartridge 200 pivotally moves such that the toner cartridge 200 and the toner replenishing part 300 shift from the first attachment state to the second attachment state, the first ends 242A of the shielding plates 242 press the corresponding first stepped parts 321A to pivotally move the process shutter 320. In other words, the toner shutter 240 presses the process shutter 320 such that the process shutter 320 pivotally moves from the third position to the fourth position when the toner shutter 240 pivotally moves from the first position to the second position while the toner cartridge 200 is attached to the process cartridge P1.

Also, as the toner cartridge 200 pivotally moves such that the toner cartridge 200 and the toner replenishing part 300 shift from the second attachment state to the first attachment state, the second ends 242B of the shielding plates 242 press the corresponding second stepped parts 321B to pivotally move the process shutter 320. In other words, the toner shutter 240 presses the process shutter 320 such that the process shutter 320 pivotally moves from the fourth position to the third position when the toner shutter 240 pivotally moves from the second position to the first position while the toner cartridge 200 is attached to the process cartridge P1.

In this way, the process shutter 320 is pivotally movable together with the toner shutter 240 in a state where the toner cartridge 200 is attached to the process cartridge P1.

5-3. Relationship Between Groove 224 and Protrusion 313

As illustrated in FIG. 10A, in the first attachment state, the protrusion 313 is inserted in the groove 224. In other words, in a state where the toner cartridge 200 is attached to the process cartridge P1, the protrusion 313 is inserted in the groove 224. The nozzle 220 is restrained from pivotally moving relative to the toner replenishing part 300 by the insertion of the protrusion 313 in the groove 224. This configuration enables the pivotal movement of the toner shutter 240 relative to the nozzle 220 between the first position and the second position while the protrusion 313 is inserted in the groove 224, as illustrated in FIGS. 10A and 10B.

Note that the toner shutter 240 pivotally moves together with the handle 230 relative to the process housing 31 in accordance with the pivotal movement of the handle 230. On the other hand, the nozzle 220 does not pivotally move relative to the process housing 31. Therefore, the handle 230 is pivotally movable together with the toner shutter 240 about the toner shutter axis Y1 relative to the nozzle 220.

Further, the toner container 210 pivotally moves together with the handle 230 relative to the process housing 31 in accordance with the pivotal movement of the handle 230. Therefore, the toner container 210 is pivotally movable about the toner shutter axis Y1 relative to the nozzle 220 in a state where the toner cartridge 200 is attached to the process cartridge P1.

5-4. Relationship Between Toner Outlet Ports 223A and Toner Inlet Ports 300A In the first attachment state illustrated in FIG. 10A, the toner shutter 240 closes the toner outlet ports 223A, and the process shutter 320 closes the toner inlet ports 300A. In other words, in the first attachment state, the toner shutter 240 is in the first position and the process shutter 320 is in the third position. Hence, toner is not supplied to the process housing 31 in the first attachment state.

Then, as the toner cartridge 200 pivotally moves, the toner cartridge 200 and the toner replenishing part 300 shift from the first attachment state illustrated in FIG. 10A to the second attachment state illustrated in FIG. 10B. At this time, the toner shutter 240 and the process shutter 320 pivotally moves together.

In the second attachment state illustrated in FIG. 10B, the toner shutter 240 opens the toner outlet ports 223A, and the process shutter 320 opens the toner inlet ports 300A. In other words, the toner shutter 240 is in the second position and the process shutter 320 is in the fourth position in the second attachment state. As a result, the toner outlet ports 223A are in communication with the corresponding toner inlet ports 300A through the shutter openings 320A. In the second attachment state, the user can replenish the process cartridge P1 with toner accommodated in the toner cartridge 200.

5-5. Relationship Between Toner Electrical Contact 261 and Second Process Electrical Terminal 332

In the first attachment state illustrated in FIG. 11B, the toner electrical contact 261 is in contact with the second process electrical terminal 332. Therefore, the toner electrical contact 261 is electrically connected to the second process electrical terminal 332.

The toner electrical contact 261 does not pivotally move since the toner electrical contact 261 is positioned on the nozzle 220. Further, the second process electrical terminal 332 does not pivotally move since the second process electrical terminal 332 is positioned on one of the process retaining plates 312 of the main body part 310. Hence, as illustrated in FIGS. 11B and 11C, the toner shutter 240 is pivotally movable between the first position and the second position relative to the second process electrical terminal 332 and the toner electrical contact 261.

The toner electrical contact 261 is electrically connected to the main electrical contact 14 through the second process electrical terminal 332, the harness 333, and the first process electrical terminal 331. Hence, the controller 70 of the monochromatic printer 1 can read information stored in the toner memory 260 through the main electrical contact 14.

5-6. Relationship Between Toner Retaining Plates 243 and Process Retaining Plates 312

Figure 11C:
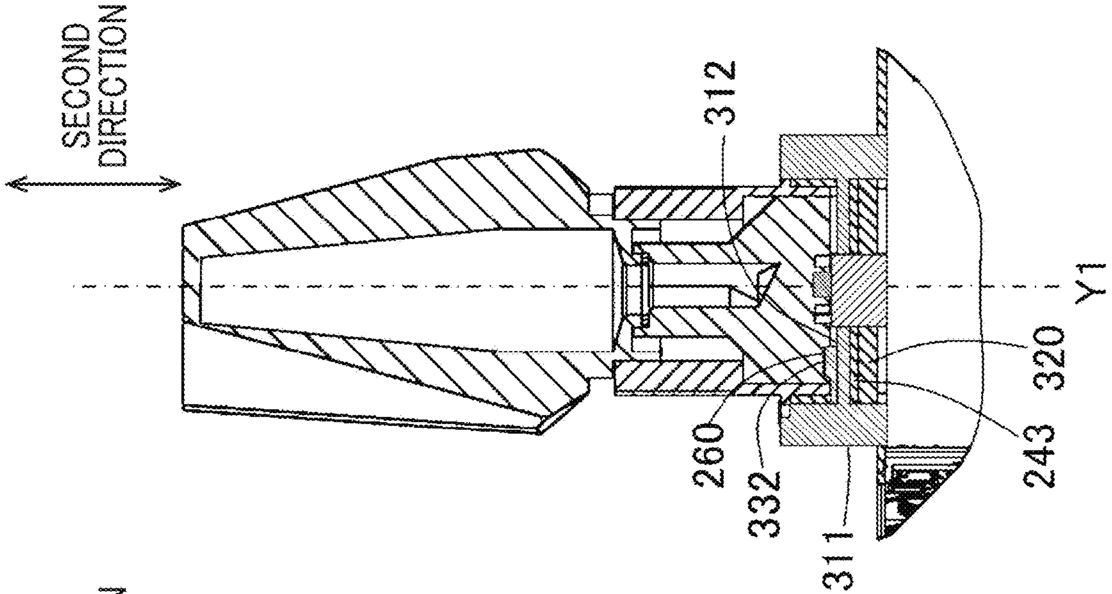
FIG. 11C is a cross-sectional view of the process cartridge and the toner cartridge attached thereto, and illustrating the second attachment state.
Figure 11B:
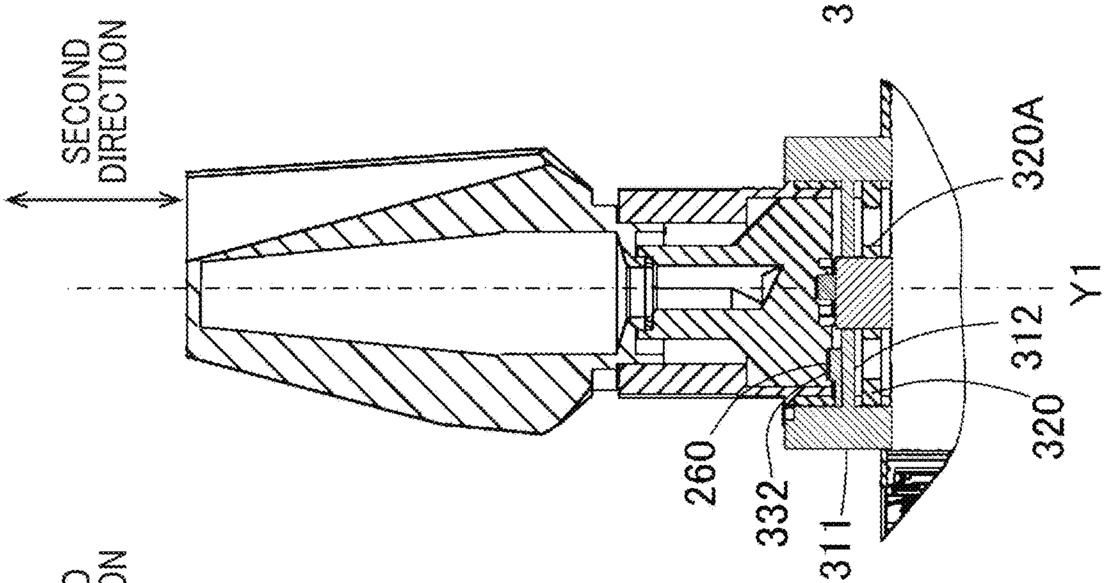
FIG. 11B is a cross-sectional view of the process cartridge and the toner cartridge attached thereto, and illustrating the first attachment state.
Figure 11A:
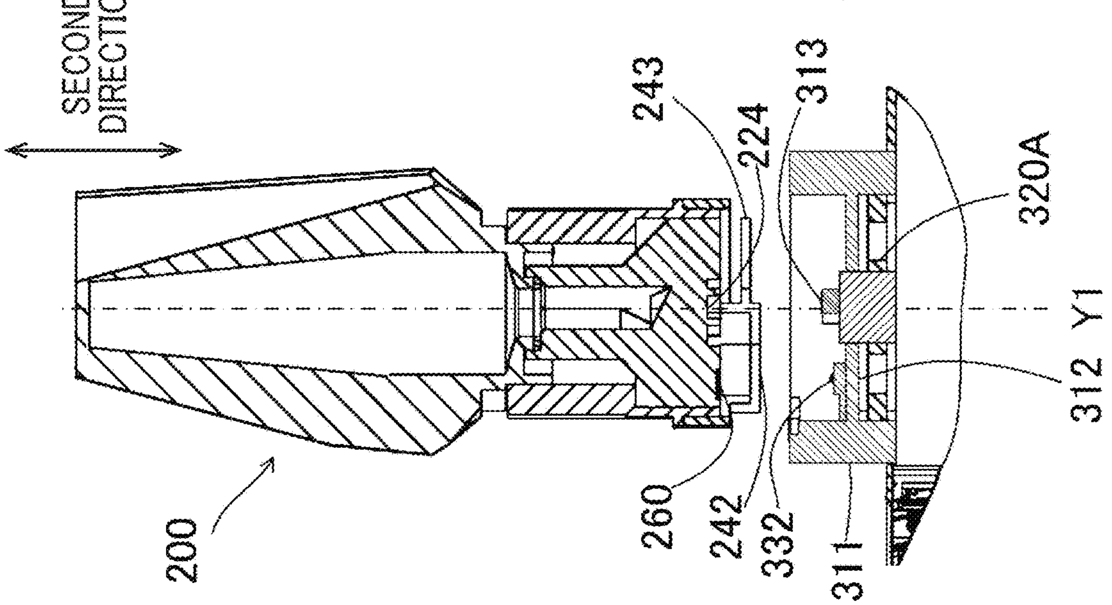
FIG. 11A is a cross-sectional view of the process cartridge and the toner cartridge, and illustrating a state prior to attaching the toner cartridge to the process cartridge.

As the toner cartridge 200 and the toner replenishing part 300 shift from the first attachment state to the second attachment state due to the pivotal movement of the toner cartridge 200, the toner shutter 240 pivotally moves from the first position to the second position to move the toner retaining plates 243 to positions immediately below the corresponding process retaining plates 312, as illustrated in FIG. 11C. As a result, in a state where the toner shutter 240 is in the second position, the toner retaining plates 243 are positioned between the corresponding process retaining plates 312 and the process shutter 320 in the second direction. Further, in a state where the toner shutter 240 is in the second position, the process retaining plates 312 are positioned between the corresponding toner retaining plates 243 and the nozzle 220 in the second direction.

In other words, in a state where the toner cartridge 200 is attached to the process cartridge P1 and the toner shutter 240 is in the second position, the process retaining plates 312 are positioned between the corresponding toner retaining plates 243 and the toner housing 201 in the second direction. With this configuration, the process retaining plates 312 restrain the toner retaining plates 243 from moving in the second direction to thereby restraining unintentional detachment of the toner cartridge 200 from the toner replenishing part 300.

Note that, in the second attachment state, the second process electrical terminal 332 is positioned on the opposite side of the process retaining plates 312 from the toner retaining plates 243 in the second direction. Hence, the toner retaining plates 243 do not interfere with the second process electrical terminal 332 when the toner retaining plates 243 move to the positions below the corresponding process retaining plates 312 in accordance with the pivotal movement of the toner shutter 240. Accordingly, the detachment of the toner cartridge 200 can be retained while the second process electrical terminal 332 and the toner electrical contact 261 are maintained contact with each other.

5-7. Summary

As described above, when the toner cartridge 200 and the toner replenishing part 300 are in the first attachment state, the toner shutter 240 is in the first position and the process shutter 320 is in the third position. Hence, replenishment of the process cartridge P1 with toner is not performed in the first attachment state. On the other hand, when the toner cartridge 200 and the toner replenishing part 300 are in the second attachment state, the toner shutter 240 is in the second position and the process shutter 320 is in the fourth position. Accordingly, toner can be supplied from the toner cartridge 200 to the process cartridge P1 in the second attachment state.

The toner shutter 240 and the process shutter 320 pivotally move together as the toner cartridge 200 and the toner replenishing part 300 change between the first attachment state and the second attachment state. On the other hand, the toner electrical contact 261 and the second process electrical terminal 332 do not pivotally move even when the toner cartridge 200 and the toner replenishing part 300 change between the first attachment state and the second attachment state.

Hence, in a state where the toner cartridge 200 is attached to the process cartridge P1, the toner shutter 240 is pivotally movable relative to the second process electrical terminal 332 and the toner electrical contact 261 between the first position in which the toner shutter 240 closes the toner outlet ports 223A and the second position in which the toner shutter 240 opens the toner outlet ports 223A. Accordingly, the toner electrical contact 261 and the second process electrical terminal 332 are maintained contact with each other in spite of the pivotal movement of the toner shutter 240 between the first position and the second position.

6. Advantageous Effects

According to the above-described embodiment of the present disclosure, in a state where the toner cartridge 200 is attached to the process cartridge P1, the toner shutter 240 is pivotally movable relative to the second process electrical terminal 332 and the toner electrical contact 261 between the first position in which the toner shutter 240 closes the toner outlet ports 223A and the second position in which the toner shutter 240 opens the toner outlet ports 223A. Hence, in a configuration in which the toner cartridge 200 includes the toner memory 260, the toner outlet ports 223A can be opened and closed while maintaining electrical contact between the second process electrical terminal 332 and the toner electrical contact 261.

Further, since the toner electrical contact 261 faces in the second direction, which is also a direction in which the toner cartridge 200 is attached to the process cartridge P1, wear of the toner electrical contact 261 when the toner electrical contact 261 contacts the second process electrical terminal 332 can be reduced in comparison with a configuration in which the toner electrical contact 261 faces in a direction different from the direction of the attachment of the toner cartridge 200 to the process cartridge P1.

Further, positioning of the toner cartridge 200 relative to the process cartridge P1 is fixed by the insertion of the protrusion 313 in the groove 224. Still further, since both the protrusion 313 and the groove 224 have substantially rectangular shape when viewed in the second direction, the protrusion 313 can restrain the nozzle 220 from pivotal moving relative to the process housing 31, thereby enabling only the toner shutter 240 to pivotally move to open and close the toner outlet ports 223A.

Further, the protrusion 313 does not interfere with the pivotal movement of the toner shutter 240 in a state where the protrusion 313 is inserted in the groove 224, since the groove 224 is at a position overlapped with the toner shutter axis Y1. Assuming that the groove 224 is positioned offset from the toner shutter axis Y1, attention is needed for a design of the toner outlet ports 223A, the toner shutter 240, and the groove 224 such that these parts are not positioned within a locus of the pivotal movement of the toner shutter 240. In contrast, according to the configuration in the above-described embodiment, relatively high degree of freedom in design can be realized since the groove 224 does not interfere with the pivotal movement of the toner shutter 240.

Further, the toner container 210 is pivotally movable relative to the nozzle 220. This configuration can restrain the user from erroneously pivotally moving the toner shutter 240 to the position in which the toner outlet ports 223A are opened. Specifically, assuming that the toner container 210 is not pivotally movable relative to the nozzle 220, the toner shutter 240 may pivotally move relative to the nozzle 220 to open the toner outlet ports 223A in a case where the user pivotally moves the toner shutter 240 while gripping the toner container 210 in a state where the toner cartridge 200 is not attached to the process cartridge P1.

In other words, according to the above configuration, the toner outlet ports 223A may be opened and closed just by the pivotal movement of the toner shutter 240 due to the configuration in which the toner container 210 and the nozzle 220 are not pivotally movable relative to each other. In contrast, according to the configuration in the above-described embodiment, the toner shutter 240 does not open and close the toner outlet ports 223A even if the toner shutter 240 tries to pivotally move, since the toner container 210 is also pivotally movable relative to the nozzle 220.

Further, since the handle 230 covers the outer peripheral surface of the nozzle 220, fixing of the nozzle 220 can be restrained in a state other than the state where the toner cartridge 200 is attached to the process cartridge P1. Hence, opening and closing of the toner outlet ports 223A by the toner shutter 240 can be restrained in a state other than the state where the toner cartridge 200 is attached to the process cartridge P1.

Further, the toner electrical contact 261 is positioned on the nozzle 220. With this arrangement, stabilized contact between the second process electrical terminal 332 and the toner electrical contact 261 can be obtained since the nozzle 220 does not pivotally move by the pivotal movement of the toner shutter 240 in a state where the toner cartridge 200 is attached to the process cartridge P1.

Further, the process shutter 320, which opens and closes the toner inlet ports 300A, is pivotally movable relative to the toner electrical contact 261 and the second process electrical terminal 332 in a state where the toner cartridge 200 is attached to the process cartridge P1. Accordingly, the toner inlet ports 300A can be opened and closed while the toner electrical contact 261 and the second process electrical terminal 332 are in contact with each other, thereby realizing stabilized contact between the toner electrical contact 261 and the second process electrical terminal 332.

Further, the toner outlet ports 223A and the toner inlet ports 300A are opened concurrently since the toner shutter 240 and the process shutter 320 pivotally move together, whereby leakage of toner to the outside can be suppressed in a state other than a state where the replenishment of the process cartridge P1 with toner is performed.

Further, the process shutter 320 pivotally moves due to a pressing force applied by the toner shutter 240. Hence, there is no need to provide a separate component for pivotally moving the process shutter 320.

The second process electrical terminal 332 does not interfere with the toner retaining plates 243 at the time of insertion of the toner retaining plates 243 into the gap between the process retaining plates 312 and the process shutter 320. Hence, unintentional detachment of the toner cartridge 200 from the toner replenishing part 300 can be restrained while maintaining contact between the second process electrical terminal 332 and the toner electrical contact 261.

Further, contact of the first process electrical terminal 331 with the main electrical contact 14 can be easily realized, since the first process electrical terminal 331 is positioned at the other end in the second direction of the process housing 31. More specifically, the first process electrical terminal 331 can contact the main electrical contact 14 as a result of attachment of the process housing 31 to the main housing 10 through the first opening 10A before closing the front cover 11 and the top cover 12.

Further, since both the first process electrical terminal 331 and the second process electrical terminal 332 are positioned close to the other end in the third direction of the process housing 31, a length of the harness 333 can be shortened. With this configuration, mixing of noise on signals in communication lines from the toner memory 260 to the controller 70 through the harness 333 of the process cartridge P1 can be reduced.

Further, since the replenishment cover 13 is provided to open and close the second opening 10B, the replenishment cover 13 needs to be opened only when replenishing the process cartridge P1 with toner from the toner cartridge 200. Accordingly, when the toner cartridge 200 is not attached to the toner replenishing part 300, foreign materials such as dust can be restrained from entering the main housing 10 and the toner inlet ports 300A by closing the second opening 10B with the replenishment cover 13.

Further, the replenishment cover 13 constitutes the discharge tray T in a state where the replenishment cover 13 closes the second opening 10B. Therefore, the process housing 31 and the main housing 10 can be made compact in comparison with a configuration in which the second opening 10B and the replenishment cover 13 are positioned outside the discharge tray T.

7. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, in the above-described embodiment, the toner container 210 is pivotally movable together with the toner shutter 240 in a state where the toner cartridge 200 is attached to the process cartridge P1. However, the toner shutter 240 need not be pivotally movable along with the pivotal movement of the toner container 210.

Specifically, although the toner container 210 is fixed to the handle 230 in the above-described embodiment, the present disclosure need not be limited to this configuration. For example, the toner container 210 may be fixed to the nozzle 220. In the latter case, the toner container 210 does not pivotally move, since the nozzle 220 does not pivotally move in a state where the toner cartridge 200 is attached to the process cartridge P1. With this configuration, since the toner container 210 does not pivotally move relative to the nozzle 220, leakage of toner from a gap between the nozzle 220 and the toner container 210 is unlikely to occur.

Further, according to the above-described embodiment, the handle 230 and the toner shutter 240 are two components different from each other. However, the handle 230 and the toner shutter 240 may be formed as a single member.

Further, according to the above-described embodiment, the nozzle 220 of the toner cartridge 200 has the groove 224, and the toner replenishing part 300 includes the protrusion 313. However, configurations other than that described above may be employed. As an example, the toner replenishing part 300 may have a groove, and the nozzle 220 may include a protrusion that can be inserted in the groove of the toner replenishing part 300.

Further, although the groove 224 is positioned to be overlapped with the toner shutter axis Y1 in the above-described embodiment, the present disclosure need not limited to this configuration. For example, one of the two toner outlet ports 223A may be omitted, and the groove 224 may be formed at a position in which the omitted outlet port 223A were provided. In the latter case, the toner shutter 240 may be configured to open and close the single toner outlet port 223A while avoiding overlapping relation between the locus of the toner shutter 240 and the groove 224. Further, in this case, the protrusion 313 is positioned offset from the process shutter axis Y2 so that the protrusion 313 can be inserted in the groove 224 in a state where the toner cartridge 200 is attached to the process cartridge P1.

Further, in the above-described embodiment, the first process electrical terminal 331 is positioned at the other end in the second direction of the process housing 31. As a modification, the first process electrical terminal 331 may be positioned at the one end in the second direction of the process housing 31. Alternatively, the first process electrical terminal 331 may be positioned at one end or another end in the first direction of the process housing 31. Further, the harness 333 may be positioned at one end or another end in the first direction of the process housing 31. Even in such a configuration, contact of the first process electrical terminal 331 with the main electrical contact 14 can be easily achieved, since the position of the first process electrical terminal 331 can be designed irrespective of the position of the second process electrical terminal 332.

Further, according to the above-described embodiment, the process cartridge P1 is attachable to and detachable from the main housing 10. However, as a modification, the process cartridge P1 may be modified to include a developing cartridge including a developing roller and a drum cartridge including a photosensitive drum, and the developing cartridge may be attachable to or detachable from the drum cartridge. Alternatively, a drum cartridge and a developing cartridge may be attachable to and detachable from the main housing 10 independently of each other.

Further, in the above-described embodiment, the monochromatic printer 1 serves as one example of the image forming apparatus. However, a color printer including process cartridges respectively corresponding to color of black, magenta, yellow, and cyan may also be available as the image forming apparatus. In the latter case, a toner cartridge corresponding to each process cartridge may be attachable thereto, or a toner cartridge corresponding to color of black whose toner is heavily used may only be attachable to the corresponding process cartridge.

Further, the parts and the components used in the embodiment and the modifications described above may be combined as appropriate to be implemented.

What is claimed is:

1. An image forming apparatus comprising:
- a main housing having a first opening and a second opening, the main housing including:
  - a main electrical contact;
- a process cartridge attachable to and detachable from the main housing through the first opening, the process cartridge including:
  - a developing roller rotatable about a developing roller axis extending in a first direction;
  - a process housing having a toner inlet port and configured to accommodate toner therein;
  - a first process electrical contact in contact with the main electrical contact in a state where the process cartridge is attached to the main housing; and
  - a second process electrical contact electrically connected to the first process electrical contact; and
- a toner cartridge attachable to and detachable from the process cartridge through the second opening in a second direction different from the first direction in a state where the process cartridge is attached to the main housing, the toner cartridge including:
  - a toner housing having a toner outlet port and configured to accommodate toner therein;
  - a toner memory including a toner electrical contact, the toner memory storing therein information related to the toner cartridge; and
  - a toner shutter configured to open and close the toner outlet port, wherein, in a state where the toner cartridge is attached to the process cartridge:
- a part of the toner housing is exposed to an outside of the main housing;
- the toner electrical contact is in contact with the second process electrical contact; and
- the toner shutter is pivotally movable about a toner shutter axis extending in the second direction relative to the second process electrical contact and the toner electrical contact between:
  - a first position in which the toner shutter closes the toner outlet port; and
  - a second position in which the toner shutter opens the toner outlet port.

2. The image forming apparatus according to claim 1, wherein the toner electrical contact faces in the second direction.

3. The image forming apparatus according to claim 1, wherein the toner housing includes:
- a nozzle having the toner outlet port; and
- a toner container accommodating toner therein, wherein the process housing includes:
- a protrusion protruding in the second direction, wherein the nozzle has a groove in which the protrusion is inserted in a state where the toner cartridge is attached to the process cartridge, and wherein the toner shutter is pivotally movable between the first position and the second position relative to the nozzle while the protrusion is inserted in the groove.

4. The image forming apparatus according to claim 3, wherein the groove is aligned with the toner shutter axis.

5. The image forming apparatus according to claim 4, wherein, in a state where the toner cartridge is attached to the process cartridge, the toner container is pivotally movable about the toner shutter axis together with the toner shutter relative to the nozzle.

6. The image forming apparatus according to claim 5, wherein the toner cartridge further includes:
- a handle covering an outer peripheral surface of the nozzle, wherein the toner shutter is positioned at one end in the second direction of the handle, wherein the toner container is positioned at another end in the second direction of the handle, and wherein, in a state where the toner cartridge is attached to the process cartridge, the handle is pivotally movable about the toner shutter axis together with the toner shutter relative to the nozzle.

7. The image forming apparatus according to claim 3, wherein the toner electrical contact is positioned on the nozzle.

8. The image forming apparatus according to claim 7, wherein the toner shutter includes:
- a toner retaining plate, wherein the process housing further includes:

a process retaining plate, and wherein, in a state where the toner cartridge is attached to the process cartridge and the toner shutter is in the second position:

the process retaining plate is positioned between the toner retaining plate and the toner housing in the second direction; and the second process electrical contact is positioned on an opposite side of the process retaining plate from the toner retaining plate in the second direction.

9. The image forming apparatus according to claim 1, wherein the process housing includes:

a process shutter configured to open and close the toner inlet port, and wherein, in a state where the toner cartridge is attached to the process cartridge, the process shutter is pivotally movable about a process shutter axis extending in the second direction relative to the second process electrical contact and the toner electrical contact between:

a third position in which the process shutter closes the toner inlet port; and a fourth position in which the process shutter opens the toner inlet port.

10. The image forming apparatus according to claim 9, wherein, in a state where the toner cartridge is attached to the process cartridge, the process shutter is pivotally movable together with the toner shutter, wherein, in a state where the toner shutter is in the first position, the process shutter is in the third position, and wherein, in a state where the toner shutter is in the second position, the process shutter is in the fourth position.

11. The image forming apparatus according to claim 10, wherein, when the toner shutter pivotally moves from the first position to the second position in a state where the toner cartridge is attached to the process cartridge, the toner shutter presses the process shutter such that the process shutter pivotally moves from the third position to the fourth position.

12. The image forming apparatus according to claim 1, wherein the second process electrical contact is positioned at one end in the second direction of the process housing, and wherein the first process electrical contact is positioned at another end in the second direction of the process housing.

13. The image forming apparatus according to claim 12, wherein the process cartridge further includes:

a harness electrically connecting the first process electrical contact and the second process electrical contact to each other, wherein the developing roller is positioned at one end in a third direction of the process housing, wherein at least a part of the harness is positioned at another end in the third direction of the process housing, and wherein both the first process electrical contact and the second process electrical contact are positioned closer to the another end in the third direction of the process housing than to the one end in the third direction of the process housing.

14. The image forming apparatus according to claim 1, wherein the main housing further includes:

a replenishment cover positioned at one end in the second direction of the main housing and configured to open and close the second opening.

15. The image forming apparatus according to claim 14, wherein the main housing further includes:

a discharge tray on which a sheet discharged out of the main housing is to be mounted, and wherein, in a state where the replenishment cover closes the second opening, the replenishment cover constitutes the discharge tray.

* * * * *